April 30, 1940. W. COOK 2,199,283
FLEXIBLE DEAD-END SPLICE
Filed March 31, 1938
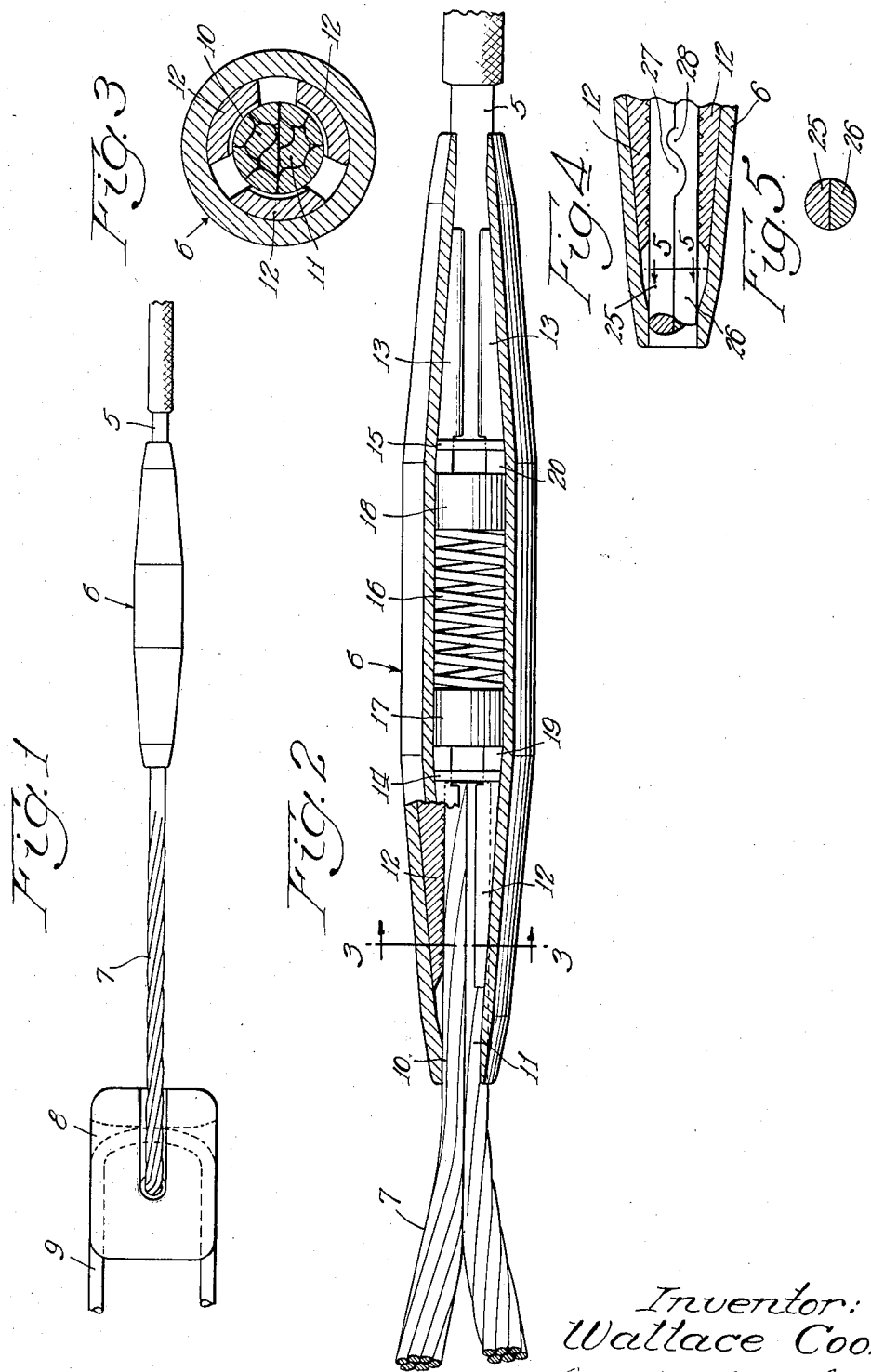
Inventor:
Wallace Cook Patented Apr. 30, 1940

2,199,283

UNITED STATES PATENT OFFICE 2,199,283

FLEXIBLE DEAD-END SPLICE

Wallace Cook, Chicago, Ill., assignor to Reliable Electric Company, Chicago, Ill., a corporation of Illinois Application March 31, 1938, Serial No. 199,082

4 Claims. (Cl. 24—123)

The present invention relates to dead-end splices for distribution lines. The splice is particularly applicable to those situations where the conductor is to be anchored to a suitable support through an insulator and a means for connecting the insulator to the support. These connections are easily made through a strain insulator or a spool type insulator, the spool type insulators being mounted on the clevises or secondary racks.

It is the principal purpose of the present invention to provide a flexible dead end connector which shall be highly efficient insofar as holding strength upon the conductor to be anchored is concerned, and which is also simple and economical.

The present invention contemplates the provision of a connector which comprises in combination a flexible loop of wire, the two ends of which are flattened and swaged down into half round sections which together make a circular end that can be gripped in a line splice or secured in a line splice by swaging the shell of the splice down upon the ends of the loop in the factory.

The features and advantages of the invention will appear more fully from the following description, reference being had to the accompanying drawing, wherein a preferred form of the invention is shown. It is to be understood, however, that the drawing and description are illustrative only, and should not be taken as limiting the invention, except insofar as it is limited by the claims.

In the drawing,

Fig. 1 is a plan view illustrating the invention as applied in making a dead end connection;

Fig. 2 is an enlarged view partly in section, showing the manner in which the flexible loop is connected to the conductor through a line splice;

Fig. 3 is an enlarged sectional view taken on the line 3—3 of Fig. 2;

Figs. 4 and 5 are fragmentary views showing a modified loop construction.

Referring now to the drawing, the present invention is shown as applied to a dead end connection wherein a conductor 5 is connected through a line splice 6, which is of the general type having gripping jaws therein, spring pressed outwardly into the tapered ends of a surrounding shell. The line splice 6 receives the conductor at one end, and at the other end receives the opposite ends of a flexible wire loop 7 that is adapted to pass around or through an insulator 8, which is mounted upon a suitable support such as a transmission line pole by any suitable means such as a clevis or second wire loop 9. The manner of mounting the loop 7 to the support may be varied to suit the particular installation using either the well-known type of strain insulator, commonly called a "johnny-ball," or spool insulators mounted on clevises or on secondary racks. In any of these forms, the wire loop 7 passes around the insulator, and the two ends of the wire loop are then gripped in the line splice 6.

The wire loop 7 has its opposite ends 10 and 11 swaged down into a half round shape, as illustrated clearly in Fig. 3. Where the wire is stranded, as shown in the drawing, the several strands are pressed closely together by the swaging operation, and deformed to produce a solid, or substantially solid, half round end portion. To facilitate holding the strands in place when they are being swaged, the strands may first be stuck together with solder. They will then not spread apart in the swaging operation and will be somewhat easier to handle.

As a specific example of the manner of forming the wire loop 7, and the results obtained, if a length of No. 4 stranded copper wire be swaged at the ends into half rounds, the total area of the two ends, when put together, would be double that of the cross sectional area, less the elongation which occurs in the swaging operation. A No. 4 copper wire is approximately sixty percent of the area of the No. 2 copper wire. The total area of the two half rounds of the copper wire, when swaged down, is pretty close to the area of the No. 2 copper wire, and the loop so constructed has at least about twenty-five percent more strength than a single piece of copper wire of No. 4 size. The two half round ends, however, will fit in the jaws of a line splice made for No. 2 copper wire. Since the stranded wire has been materially reduced in cross section by the swaging operation, it is quite possible to use a line splice which will hold a No. 2 solid wire, and which will also hold a No. 4 stranded wire, to connect the No. 4 stranded conductor to the flexible loop 7. This connection is made as shown in Fig. 2, where the two half round ends 10 and 11 of the loop 7 are gripped in the line splice 6 between the jaws 12 thereof. At the other end of the line splice 6, a stranded conductor 5 is gripped between jaws 13 of the line splice. The jaws 12 and 13 are radially movable in slots in a pair of disks 14 and 15 and are pressed outwardly by means of a spring 16 bearing in cups 17 and 18 that abut the ends of the jaws at 19 and 20. If it is desired to connect a No. 4 solid stranded wire to the flexible loop 7, a line splice 6, having one end made to receive the No. 4 solid wire, and the other end to receive a No. 2 solid wire or No. 4 stranded wire, may be used. A line splice of this character is constructed simply by reducing the shell and jaw size for one-half the shell length and utilizing the smaller jaws necessary to grip the smaller wire.

The modification shown in Figs. 4 and 5 is illustrative of the manner in which a solid wire may be formed into a flexible dead-end loop. A length of solid wire is provided with two half round portions 25 and 26. These portions are complementary parts of a round section which may be held in a line splice just as ends 10 and 11 are held in Fig. 2. The portions 25 and 26 may be provided with interlocking parts 27 and 28 to insure that the ends of the loop are together when they are shoved into a line splice. This interlocking feature is, of course, applicable to the stranded wire form shown in Figs. 1-3.

It is believed to be evident from the foregoing disclosure that the present invention results in the production of a novel flexible dead end connector wherein the opposite ends of a flexible wire are swaged into half rounds and combined with an automatic line splice to complete the dead-end connector.

Having thus described the invention, what I claim as new and desire to secure by Letters Patent is:

1. In a flexible dead-end connector, a line splice having gripping means therein whereby to grip a wire conductor inserted from either end, and a flexible wire having its ends fitting flatly together as complementary parts of a substantially round end, said round end being located in said line splice said complementary parts having transversely running interlocking portions whereby to prevent endwise movement of one of said parts with respect to the other.

2. In a dead-end connector, means for connecting a line splice to a support comprising a loop element, said loop element comprising a length of wire the opposite end portions of which are complementary parts of a substantially cylindrical end for insertion in said line splice, said complementary parts including interlocking portions on the opposed surfaces of said parts engaging each other and preventing endwise movement of one part with respect to the other.

3. In a device of the character described the combination of a tubular line splice having an end opening adapted to receive a cylindrical body such as a wire, gripping means in said line splice operable to grip and hold the cylindrical body, and a loop forming element comprising wire strands twisted together, the end portions of said element being substantially solid and semi-circular in cross section with their flat faces together, and said end portions providing a cylindrical body for insertion in said line splice.

4. In a device of the character described, the combination of a tubular line splice having an end opening adapted to receive a cylindrical body such as a wire, gripping means in said line splice operable to grip and hold the cylindrical body, and a loop element comprising a length of wire the opposite end portions of which are complementary parts of a substantially cylindrical end insertable in said line splice, said end portions having complementary depressions and projections on their engaging surfaces which serve to prevent relative endwise movement of one portion with respect to the other.

WALLACE COOK.